United States Patent [19]

Ogawa et al.

[11] Patent Number: 4,722,862
[45] Date of Patent: Feb. 2, 1988

[54] MAGNETIC RECORDING MEDIUM

[75] Inventors: Hiroshi Ogawa; Nobuo Yamazaki; Yasuo Tamai, all of Odawara, Japan

[73] Assignee: Fuji Photo Film Co., Ltd., Japan

[21] Appl. No.: 850,614

[22] Filed: Apr. 11, 1986

[30] Foreign Application Priority Data

Apr. 11, 1985 [JP] Japan ................... 60-78032

[51] Int. Cl.$^4$ .............................. G11B 5/70
[52] U.S. Cl. ................... 428/323; 428/329; 428/694; 428/900
[58] Field of Search ............ 428/694, 900, 323, 329; 427/128, 131

[56] References Cited

U.S. PATENT DOCUMENTS

| | | | |
|---|---|---|---|
| 4,135,016 | 1/1979 | Ogawa et al. | 428/900 |
| 4,135,031 | 1/1979 | Akashi et al. | 428/900 |
| 4,439,486 | 3/1984 | Yamada et al. | 428/900 |

Primary Examiner—Paul J. Thibodeau
Attorney, Agent, or Firm—Gerald J. Ferguson, Jr.; Michael P. Hoffman; Michael J. Foycik, Jr.

[57] ABSTRACT

A magnetic recording medium comprising a nonmagnetic support and a magnetic recording layer provided on said support, said magnetic recording layer comprising a ferromagnetic powder dispersed in a binder, in which $H_1$ in terms of oersted which is a value of external magnetic field determined when a magnetic flux density of a magnetic hysteresis curve determined in the direction of orientation of the ferromagnetic powder in the magnetic recording layer in the fourth quadrant is equivalent to one-third of the maximum magnetic flux density of said magnetic hysteresis curve in the third quadrant;

$H_2$ in terms of oersted which is a value of external magnetic field determined when a magnetic flux density of said magnetic hysteresis curve in the first quadrant is equivalent to one-third of the maximum magnetic flux density of said magnetic hysteresis curve in the first quadrant;

Hc in terms of oersted which is a coercive force of the magnetic recording layer; and Br in terms of gauss which is a residual magnetic flux density of the magnetic recording layer, have the relationship defined by the following inequality:

$$10 \times (H_2 - H_1)/Hc \leq 0.0004 \times Br + 1.$$

7 Claims, 5 Drawing Figures

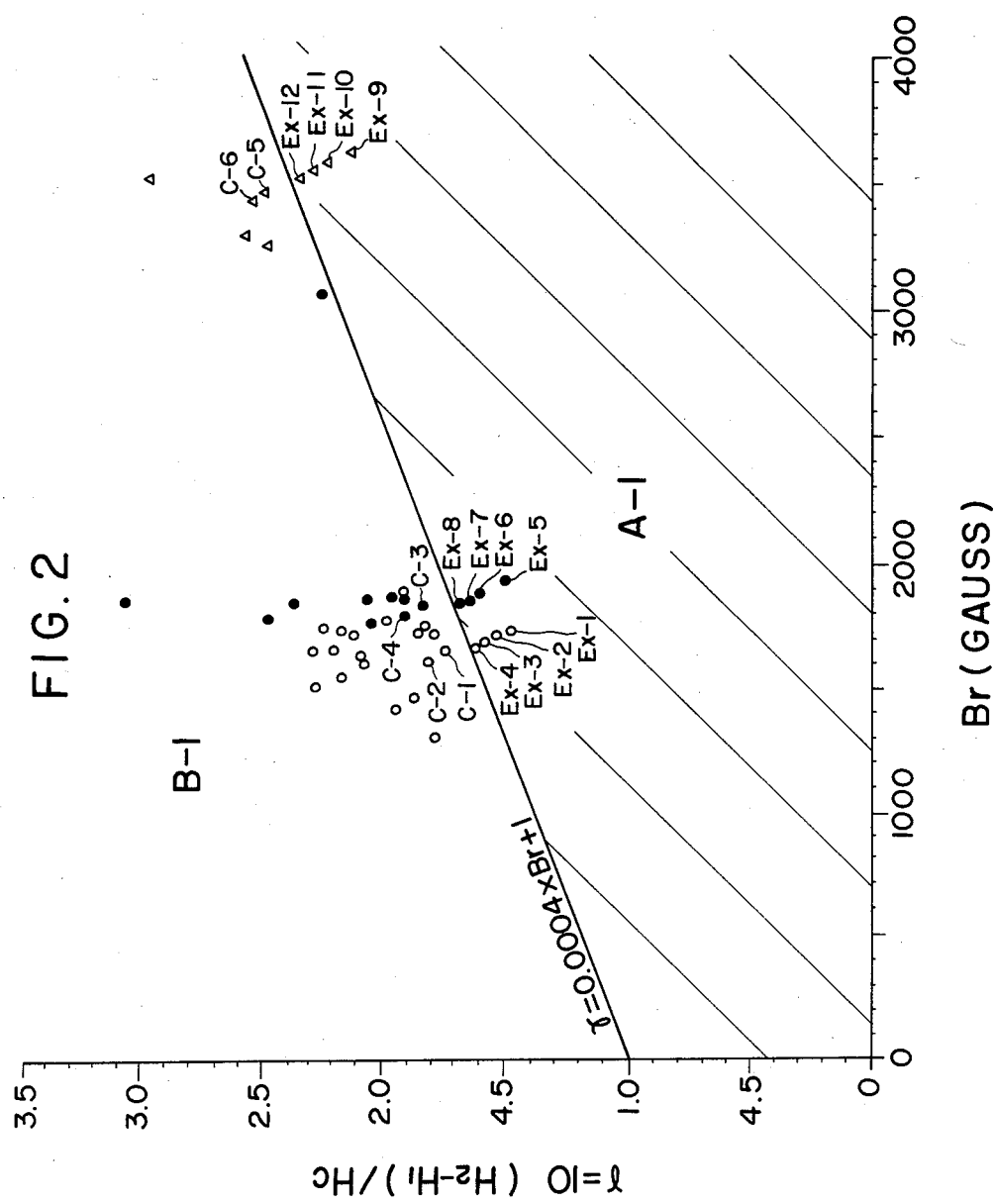

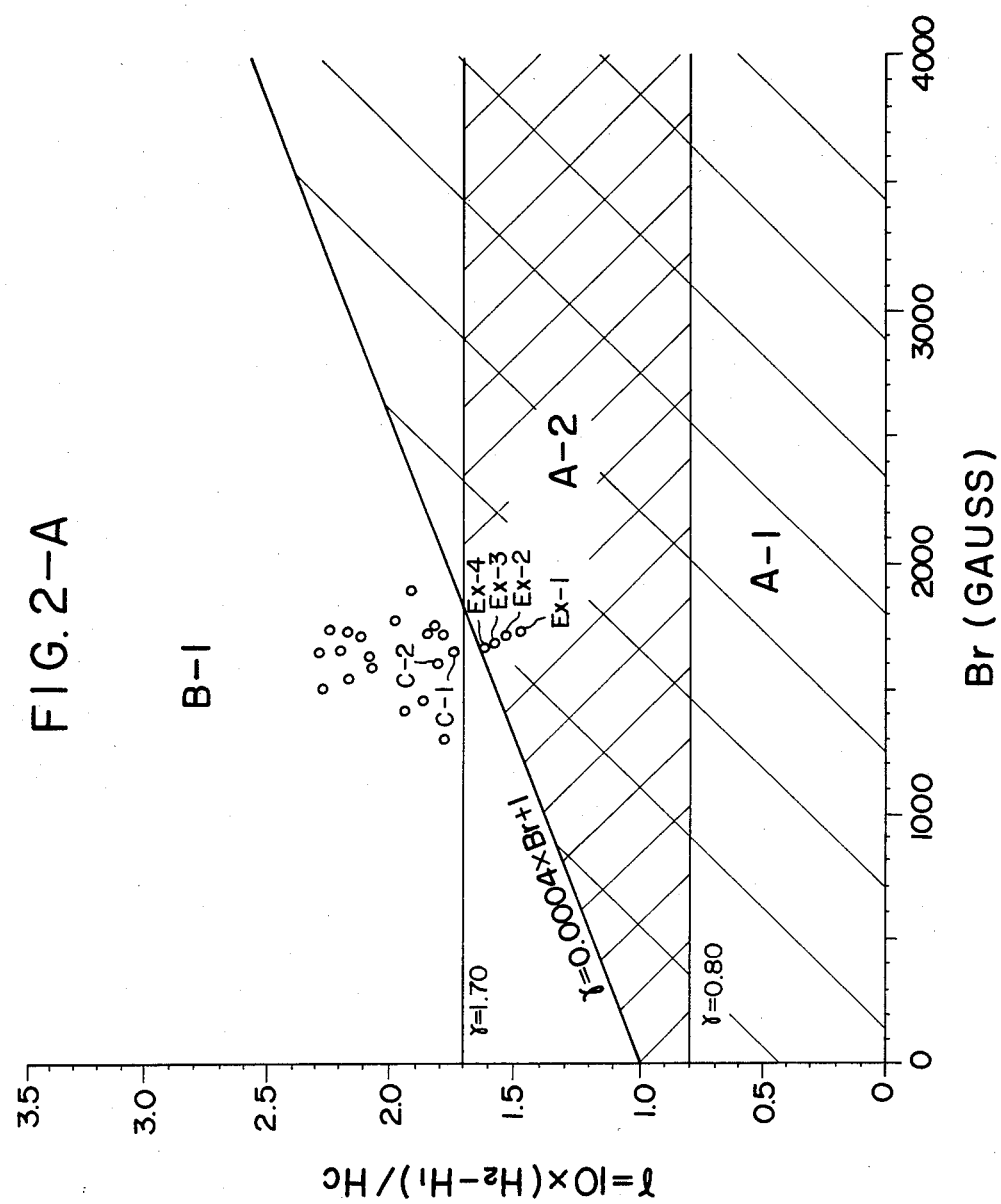

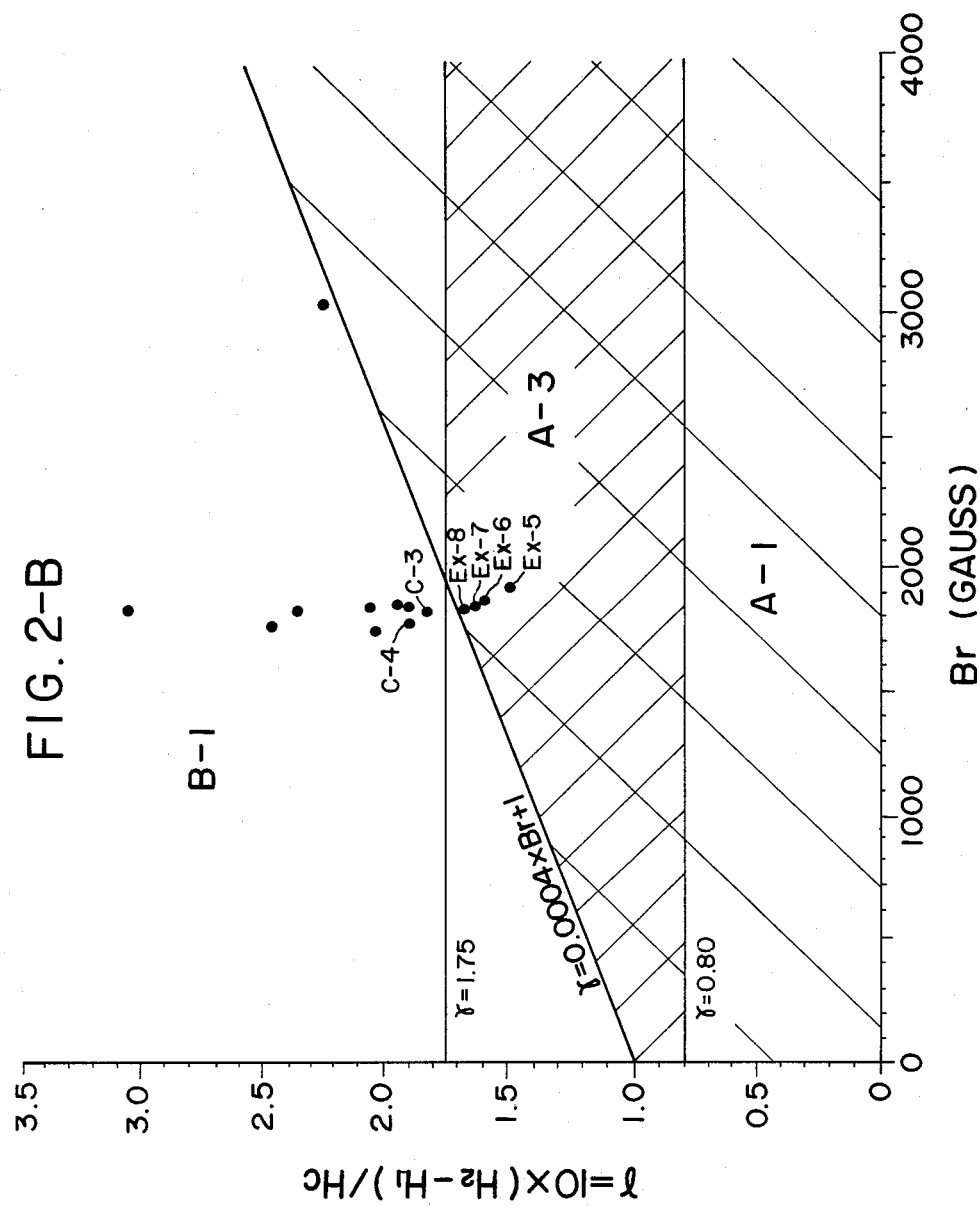

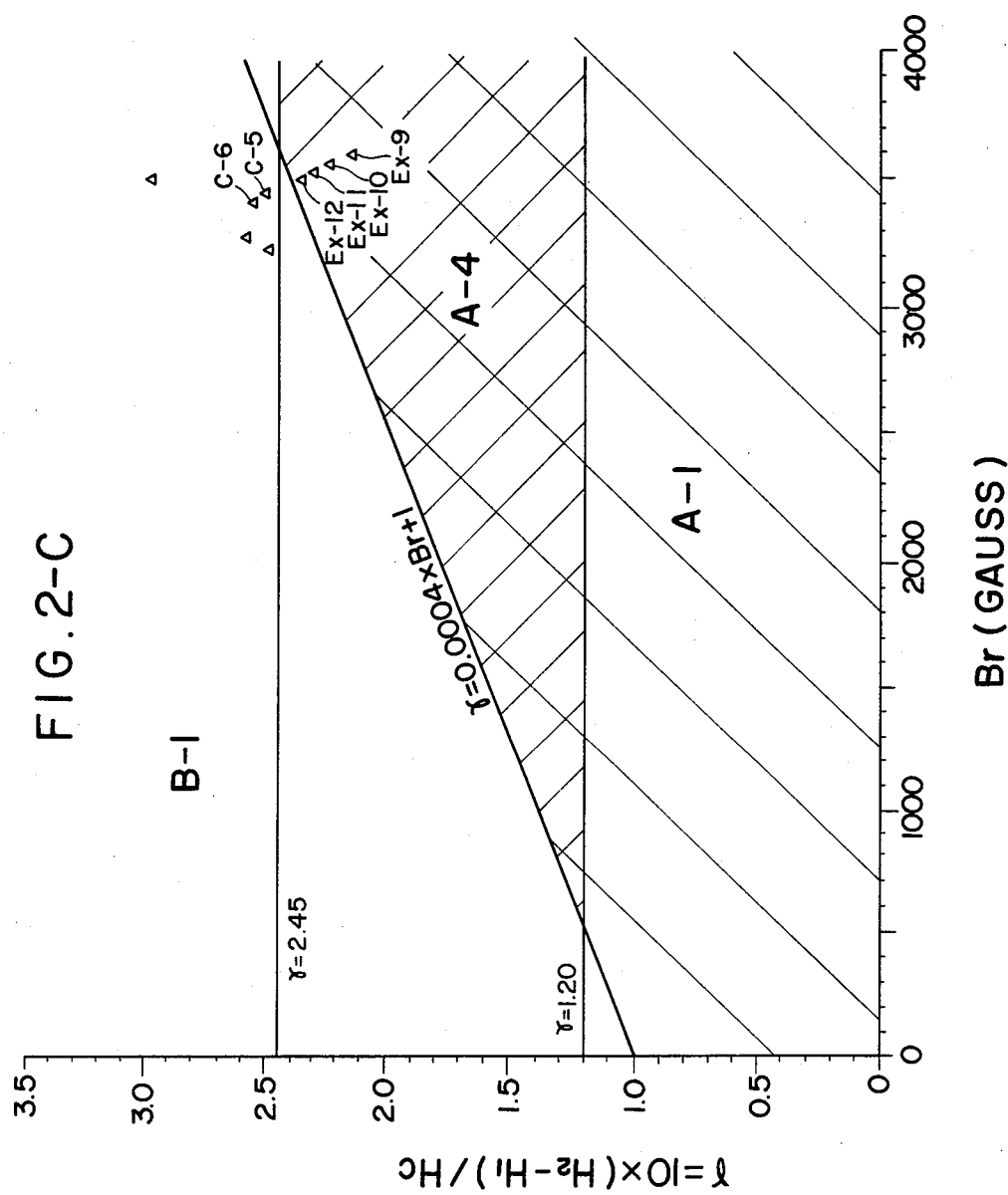

MAGNETIC RECORDING MEDIUM

BACKGROUND OF THE INVENTION

1. Field of the Invention

This invention relates to a new magnetic recording medium having improved electromagnetic conversion characteristics.

2. Description of Prior Arts

An audio cassette tape, specifically for recording music is required particularly to have excellent electromagnetic conversion characteristics. For instance, the audio cassette tape for recording music ought to be high not only in the maximum distorted power output at 315 Hz (hereinafter referred to as MOL 315) but also in the maximum power output at 10 KHz (hereinafter referred to as SOL 10K) and further ought to be low in bias noise (hereinafter referred to as BN).

As for a video cassette tape, it ought to give a reproduced sound of a high quality in the high-density reconding ssystem such as that employed in the threefold-speed tape traveling mode.

Thus, a magnetic recording medium such as audio tape or video tape is under requirement to improve electromagnetic conversion characteristics thereof.

Heretofore, there have been proposed a variety of measures for the improvement of the magnetic conversion characteristics of a magnetic recording medium, for example, through improvements with respect to the ferromagnetic powder, binder composition, dispersability of the ferromagnetic powder in the binder, orientation of the ferromagnetic powder in the magnetic recording layer.

It has been known that the electromagnetic conversion characteristics are improved by increasing the residual magnetic flux density (hereinafter referred to as Br), as is described in "Hi-Fi Tape Recorder" edited by Masahiko Morizono (Radio Technology Corp., Japan). The residual magnetic flux density increases as the squareness ratio increases. The increase of the squareness ratio is accomplished by increasing a packing density of the ferromagnetic powder in the magnetic recording layer.

The previously proposed measures for the improvement of the electromagnetic conversion characteristics are still under restrictions. For instance, the residual magnetic flux density can be increased only up to a certain limit defined by nature of the ferromagnetic powder. Accordingly, the improvement of the electromagnetic conversion characteristics based on the improvement of the residual magnetic flux density is under restriction.

It may be thought that enhancement of the coercive force (hereinafter referred to as Hc) of the magnetic recording layer brings about enhancement of SOL 10K through reduction of self-demagnetizing force. However, the enhancement of the coercive force makes the recording bias deeper or broader to increase loss in the low frequency range, whereby MOL 315 lowers. Therefore, the coercive force has to be adjusted to give a satisfactory balance between MOL 315 and SOL 10K. Thus, the increase of coercive force only is not satisfactory to give a magnetic recording medium having electromagnetic conversion characteristics in the whole area from a low frequency range to a high frequency range.

A measure of balancing the residual magnetic flux density and the coercive force is not satisfactorily effective to enhance effective value of the recording bias.

Accordingly, the prior arts hardly provide a magnetic recording medium having satisfactorily high MOL 315 value and SOL 10K value.

SUMMARY OF THE INVENTION

An object of the present invention is to provide a novel magnetic recording medium.

Another object of the invention is to provide a novel magnetic recording medium improved in the electromagnetic conversion characteristics.

There is provided by the present invention a magnetic recording medium comprising a nonmagnetic support and a magnetic recording layer provided on said support, said magnetic recording layer comprising a ferromagnetic powder dispersed in a binder, in which $H_1$ in terms of oersted which is a value of external magnetic field determined when a magnetic flux density of a magnetic hysteresis curve determined in the direction of orientation of the ferromagnetic powder in the magnetic recording layer in the fourth quadrant is equivalent to one-third of the maximum magnetic flux densiy of said magnetic hysteresis curve in the third quadrant;

$H_2$ in terms of oersted which is a value of external magnetic field determined when a magnetic flux density of said magnetic hysteresis curve in the first quadrant is equivalent to one thirds of the maximum magnetic flux densiy of said magnetic hysteresis curve in the first quadrant;

Hc in terms of oersted which is coercive force of the magnetic recording layer; and Br in terms of gauss which is a residual magnetic flux density of the magnetic recording layer, have the relationship defined by the following inequality:

$$10 \times (H_2 - H_1)/Hc \leq 0.0004 \times Br + 1.$$

BRIEF DESCRIPTION OF DRAWINGS

FIG. 2 shows a relationship between $\gamma$ and Br of a magnetic recording medium of the present invention.

FIG. 2-a shows a relationship between $\gamma$ and Br of a magnetic recording medium of the present invention using a ferromagnetic iron oxide powder.

FIG. 2-b shows a relationship between $\gamma$ and Br of a magnetic recording medium of the present invention using a ferromagnetic modified powder.

FIG. 2-c shows a relationship between $\gamma$ and Br of a magnetic recording medium of the present invention using a ferromagnetic metal powder.

DETAILED DESCRIPTION OF THE INVENTION

Figure 1:
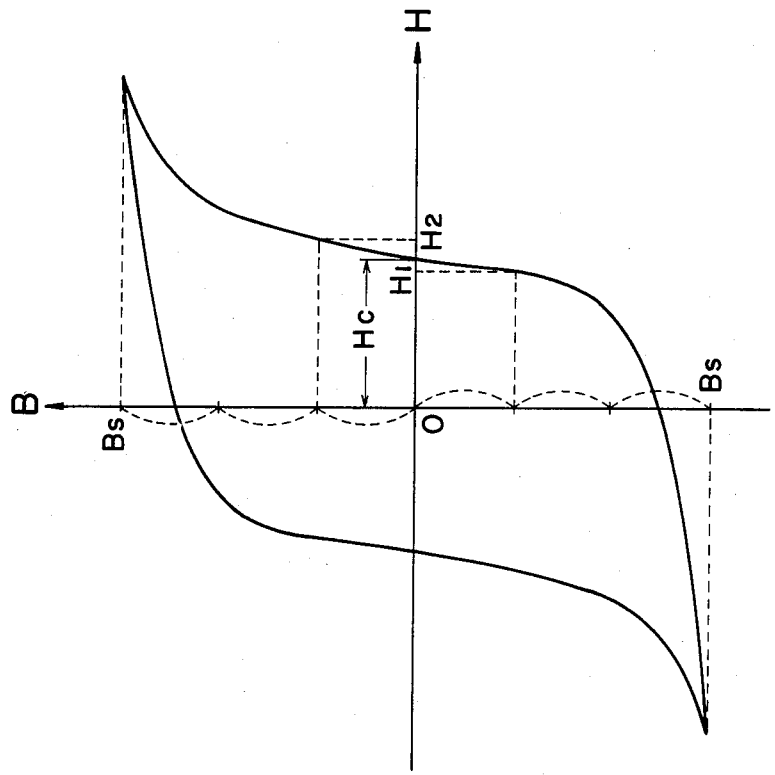
FIG. 1 illustrates a magnetic hysteresis curve of a general magnetic recording medium.

The present invention is based on the discovery that a magnetic recording medium having prominently improved electromagnetic conversion characteristics is produced by making the magnetic recording layer to have the specific values for the $H_1$, $H_2$, coercive force, and residual magnetic flux density. Thus, the magnetic recording medium of the invention provides improved electromagnetic conversion characteristics which cannot be provided by the conventional magnetic recording medium produced simply upon balancing the residual magnetic flux density and the coercive force of the magnetic recording layer.

To the knowledge of the present inventors, there has been not known a magnetic recording medium satisfying the relationship defined in the present invention.

A magnetic recording medium of the invention comprises a nonmagnetic support and a magnetic recording layer provided on the support. The magnetic recording layer comprises a ferromagnetic powder dispersed in a binder. Accordingly, as far as the basic constitution of the magnetic recording medium is concerned, the magnetic recording medium of the invention is not substantially different from the conventional one.

The characteristic feature of the magnetic recording medium of the invention resides in the specific relationship among the values of the following $H_1$, $H_2$, Hc and Br.

The specific relationship defined in the invention is described hereinafter in more detail.

FIG. 1 shows a typical magnetic hysteresis curve of a general magnetic recording medium.

The magnetic recording medium shows a hysteresis when the magnetic flux is measured in the direction of orientation of the ferromagnetic powder in the magnetic recording layer. The typical hysteresis can be given in a graph (ordinate: magnetic flux density (B), abscissa: external magnetic field) in the form of a magnetic hysteresis curve as is shown in FIG. 1. As is seen, the magnetic hysteresis curve has the maximum magnetic flux density (Bs) in the first quadrant.

The magnetic recording medium of the invention gives a magnetic hysteresis curve similar to that illustrated in FIG. 1. However, in the magnetic recording medium of the invention, the values for $H_1$, $H_2$ and Hc shown in FIG. 1 are specifically related to the residual magnetic density Br (in terms of gauss) according to the following inequality (I):

$$10 \times (H_2 - H_1)/Hc \leq 0.0004 \times Br + 1 \qquad (I).$$

In the above inequality (I), $H_1$ in terms of oersted is a value of external magnetic field determined when a magnetic flux density of a magnetic hysteresis curve determined in the direction of orientation of the ferromagnetic powder in the magnetic recording layer in the fourth quadrant is equivalent to one-thirds of the maximum magnetic flux densiy of said magnetic hysteresis curve in the third quadrant;

$H_2$ in terms of oersted is a value of external magnetic field determined when a magnetic flux density of said magnetic hysteresis curve in the first quadrant is equivalent to one-third of the maximum magnetic flux densiy of said magnetic hysteresis curve in the first quadrant;

Hc in terms of oersted is a coercive force of the magnetic recording layer; and

Br in terms of gauss is a residual magnetic flux density of the magnetic recording layer.

The residual magnetic flux density (Br) can be determined at an external magnetic field of 1,000 Oe (normal position or position I) for a magnetic recording medium using a ferromagnetic iron oxide powder. For a magnetic recording medium using a ferromagnetic Co-containing iron oxide powder, an external magnetic field of 2,000 Oe (chromium position or position II) is employed. For a magnetic recording medium using a ferromagnetic metal powder, an external magnetic field of 5,000 Oe (metal position or position IV) is employed.

In the above inequality (I), where $$10 \times (H_2 - H_1)/Hc \qquad (II)$$

is represented by $\gamma$, said $\gamma$ is expressed by the following inequality (III):

$$\gamma \leq 0.0004 \times Br + 1 \qquad (III).$$

The areas represented by the inequality (III) are illustrated in FIG. 2, FIG. 2-a, FIG. 2-b, and FIG. 2-c with oblique lines. In these figures, the $\gamma$ value of the magnetic recording medium of the invention is observed in the area indicated by A-1 on or under the straight line showing $\gamma = 0.0004 \times Br + 1$.

In contrast, the conventional magnetic recording media have the $\gamma$ values in the B-1 area above the straight line.

In FIGS. 2 and 2-a, Ex-1 to Ex-4 indicate the values of the magnetic recording media of the invention using ferromagnetic iron oxide powder which are described in the hereinafter-given Examples 1 to 4. In the FIGS., c-1 and c-2 are the $\gamma$ values of the commercially available magnetic recording media using the ferromagnetic iron oxide powder.

In FIGS. 2 and 2-b, Ex-5 to Ex-8 indicate the $\gamma$ values of the magnetic recording media of the invention using ferromagnetic modified powder such as ferromagnetic Co-containing ion oxide powder which are described in the hereinafter-given Examples 5 to 8. In the FIGS., c-3 and c-4 are the $\gamma$ values of the commercially available magnetic recording media using the ferromagnetic modified powder.

In FIGS. 2 and 2-c, Ex-9 to Ex-12 indicate the $\gamma$ values of the magnetic recording media of the invention using ferromagnetic metal powder which are described in Examples 9 to 12. In the figures, c-5 and c-6 indicate the $\gamma$ values of the commercially available magnetic recording medium using the ferromagnetic metal powder.

The $\gamma$ value of the magnetic recording meduim of the invention preferably is in the range variable depending on the nature of the ferromagnetic powder.

For instance, the $\gamma$ value of the medium using the ferromagnetic iron oxide powder preferably ranges from 0.80 to 1.70, and more preferably ranges from 1.40 to 1.77. The area satisfying the preferred range is indicated in FIG. 2-a by A-2.

The $\gamma$ value of the medium using the ferromagnetic modified powder preferably ranges from 0.80 to 1.75, and more preferably ranges from 1.40 to 1.75. The area satisfying the preferred range is indicated in FIG. 2-b by A-3.

The $\gamma$ value of the medium using the ferromagnetic iron metal powder preferably ranges from 1.20 to 2.45, and more preferably ranges from 1.40 to 2.45. The area satisfying the preferred range is indicated in FIG. 2-c by A-4.

The audio tapes according to the invention using the ferromagnetic iron oxide powder, modified powder and metal powder give high output power for MOL 315 and SOL 10K and low bias noise in the measurements in the normal position (Position I), chromium position (Position II), and metal position (Position IV), respectively.

The vido tapes according to the invention give high vide output power and high S/N ratios for both the luminance signal and color signal.

The reason why the magnetic recording medium of the invention shows such improved electromagnetic conversion characteristics is not exactly known. It is supposed that increase of effective value of the recording bias brought about by increase of the coercive force and enhanced uniformness of the dispersed ferromagnetic powder and decrease of self-demagnetization brought about by reduction of the difference between $H_2$ and $H_1$ are combined to give the favorable improvement to the magnetic recording meduim of the invention.

The magnetic recording medium of the invention which has the basic structure composed of a nonmagnetic support and a magnetic recording layer can be prepared, for example, by the following procedure.

There is no specific limitation on the nonmagnetic support employable in the present invention.

Material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support generally is in the range of 3–50 $\mu$m, preferably in the range of 5–30 $\mu$m.

In a continuous tape-type magnetic recording medium of the invention, such as an audio tape or a video tape, the magnetic recording layer is generally provided on one surface of the support. An exposed surface of the support may be provided with a back layer (backing layer).

The ferromagnetic metal powder to be contained in the magnetic recording layer of the magnetic recording medium according to the invention may be a ferromagnetic iron oxide powder, a ferromagnetic modified powder, or a ferromagnetic metal.

Examples of the ferromagnetic iron oxide powder include $\gamma$-$Fe_2O_3$, $\gamma$-$FeO_x$ (1.33 < X < 1.5), and $Fe_3O_4$.

Examples of the ferromagnetic modified powder include ferromagnetic Co-containing iron oxide powder, Ba-containing ferrite, Sr-containing ferrite, and noniron metal oxide such as $CrO_2$ containing Sn, Sb, Te or the like.

As the ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water hydroxide, or oxide. These ferromagnetic metal powders are already known, and be prepared by known methods. The ferromagnetic metal powder employable in the invention can be obtained by first preparing a ferromagnetic metal powder according to the known method, then adjusting the saturation magnetic moment and finally classifying the resulting powder based on the powder size.

There is no specific limitation on the shape of the ferromagnetic powder employable in the invention, and normally used is needle shape, grain shape, dice shape, rice shape or plate shape.

The needle shaped ferromagnetic powder preferably has a length of 0.5–0.002 $\mu$m, a width of 0.3–0.01 $\mu$m, and an aspect ratio of 1:5–1:20.

The ferromagnetic powder preferably shows high tapping density for increasing the concentration of the powder in the recording layer to enhance the squareness ratio. For instance, the needle-shaped ferromagnetic powder of the iron oxide type and the modified type preferably have a tapping density of not less than 1.0 g/cm$^3$, and the needle-shaped ferromagnetic metal powder preferably has a tapping density of not less than 0.9 g/cm$^3$.

Further, the ferromagnetic powder preferably has various improved characteristics with respect to BET specific surface area, saturation magnetization, coercive force, and the like.

The ferromagnetic powder having such improved features can be prepared by a process which is similar to the known process for the preparation of the conventional ferromagnetic powder, but is modified with respect to the reaction conditions so as to enhance the above-described features such as the coercive force, tapping density, etc. The coercive force of a magnetic recording layer is known to be almost proportional to the coercive force of the ferromagnetic powder contained therein. Accordingly, the increase of the coercive force of the magnetic recording layer is accomplished by the increase of the coercive force of the ferromagnetic powder.

For instance, the coercive force of the ferromagnetic powder can be enhanced by narrowing the particle size distribution of the powder through controlling the reaction conditions for the preparation. The tapping density can be increased by applying to the ferromagnetic powder a static pressure. More detailed conditions are described below.

In the preparation of a needle-shaped $Fe_2O_3$ having the improved features, the starting materials such as $FeCl_3$, NaOH and water(solvent) are so selected as to be highly pure. Further, fluctuation of the reaction temperature in the reaction for the preparation of $\alpha$-FeOOH is controlled within $\pm 1°$ C. Further, the mixing procedure for initiating the reaction is preferably performed to rapidly give a higly uniformed mixture by means of a high power mixing means such as a ultrasonic vibrator in combination of use of a reaction vessel equipped with a great number of nozzles for injection of the solutions therein. This is effective to reduce nonuniformness of the concentration of the reaction solution, the nonuniformness of the concentration causing the variation of the particle size of the needle-shaped $\alpha$-FeOOH.

The resulting needle-shaped $\alpha$-FeOOH crystals are then fired preferably at a controlled temperature with flactuation within $\pm 2°$ C. The fired crystals are subsequently reduced in hydrogen gas at a controlled temperature with flactuation within $\pm 5°$ C. Under these controlled conditions, the desired needle-shaped $\gamma$-$Fe_2O_3$ powder having a particle size within a narrow range can be produced.

Generally, a needle-shaped $\gamma$-$Fe_2O_3$ powder produced from iron salts in an aqueous alkaline solution is, at least in portion, under aggromerated conditions. It has been confirmed that the aggromerated powder is not favorable for preparing a ferromagnetic powder of high quality. The aggrmerated powder can be isolated to give a less aggromerated powder by applying to the powder a high pressure such as 1,000 kg/cm$^2$ using a static press. Thus isolated powder increases in the tapping density. For instance, a needle-shaped $\gamma$-$Fe_2O_3$ having been not subjected to such static pressing treatment shows a tapping density of less than 1 g/cm$^3$, while a needle-shaped $\gamma$-Fe$_2$O$_3$ has a tapping density of more than 1 g/cm$^3$ after being subjected to such static pressing treatment.

According to the above-described process, there is obtained a needle-shaped $\gamma$-Fe$_2$O$_3$ powder having a BET specific surface area of not less than 28 m$^2$/g, a saturation magnetization ($\sigma$s) of not less than 72 emu/g and a tapping density of not less than 1.0 g/cm$^3$. Further, a magnetic recording layer containing this ferromagnetic powder can show a coercive force of not less than 350 ersted.

In the case of preparing a ferromagnetic Co-containing $\gamma$-Fe$_2$O$_3$, a needle-shaped $\gamma$-Fe$_2$O$_3$ which is to be used as a core material of the Co-containing one is first produced to have a narrow Hc range according to the process stated above. Further, non-uniformness of the distribution of cobalt atmos coated over the needle-shaped $\gamma$-Fe$_2$O$_3$ is reduced by controlling the reaction conditions for the cobalt-coating, for instance, by way of reducing flactuations of the reaction temperature, purity of the starting materials, and the concentration of the reaction mixture. According to this process, the particle size distribution is also made narrow. Further, the tapping density can be increased in the same manner as above, by reducing the aggromeration using a static press.

According to the above-described process, there is obtained a needle-shaped Co-containing $\gamma$-Fe$_2$O$_3$ powder having a BET specific surface area of not less than 28 m$^2$/g, a saturation magnetization ($\sigma$s) of not less than 77 emu/g and a tapping density of not less than 1.0 g/cm$^3$. Further, a magnetic recording layer containing this ferromagnetic powder can show a coercive force of not less than 640 ersted.

The needle-shaped $\alpha$-FeOOH having the preferred features prepared as in the above can be reduced at a reducing temperature with flactuation within ±5° C. to give a ferromagnetic metal powder having the favorable features. The tapping density can be increased in the same manner as above, by reducing the aggromeration of the obtained powders using a static press.

According to the above-described process, there is obtained a needle-shaped ferromagnetic metal powder having a BET specific surface area of not less than 42 m$^2$/g, a saturation magnetization ($\sigma$s) of not less than 147 emu/g and a tapping density of not less than 0.9 g/cm$^3$. Further, a magnetic recording layer containing this ferromagnetic powder can show a coercive force of not less than 1,000 ersted.

The binder employable in the formation of the magnetic recording layer of the invention can be selected from known resins such as thermoplastic resins, thermosetting resins, and reactive resins. These resins can be employed singly or in combination.

The thermoplastic resin employable in the invention generally has a mean molecular weight of 10,000-200,000 and a polymerization degree of approx. 200-2,000. Examples of the thermoplastic resin include vinyl chloride/vinyl vinyl acetate copolymer resins, acrylic resins, cellulose derivative resins, a variety of thermoplastic resins of synthetic rubber type, polyurethane resins, polyvinyl fluoride resins, polyamide resins, polyvinyl butylate resins, styrene/butadiene copolymer resins and polystyrene resins.

The thermosetting resin or the reactive resin employable in the invention generally has a mean molecular weight of not more than 200,000 in the state of a component of a coating dispersion, and the molecular weight of those resins becomes infinity after being coated through condensation reaction or addition reaction. Preferably employable thermosetting resin is one which is does not soften or melt under heating in the course of hardening. Examples of such resins include phenol/formalin/novolak resin, phenol/formalin/resol resin, phenol/furfural resin, xylene/formalin resin, urea resin, melamine resin, drying oil alkyd resin, phenolic resin modified alkyd resin, maleic resin modified alkyd resin, unsaturated polyester resin, a mixture of epoxy resin and hardening agent, isocyanate polyether humid-setting resin, a mixture of polyisocyanate and polyurethane resin, and a mixture of polyisocyanate prepolymer and a resin having active hydrogen. If a mixture of the above-mentioned vinyl chloride/vinyl acetate copolymer and a polyurethane resin is used with polyisocyanate compound as a binder, the magnetic recording layer of the invention can be more hardened.

The amount of the binder is generally in the range of 10 to 100 parts by weight, preferably in the range of 15 to 50 parts by weight, per 100 parts by weight of the ferromagnetic metal powder.

The magnetic recording layer of the magnetic recording medium according to the invention contains generally a nonmagnetic inorganic powder preferably having a Mohs' scale of hardness of not less than 6 in an amount of 1-15 %, more specifically 1-10%, by weight based on the amount of the ferromagnetic metal powder. Examples of the nonmagnetic inorganic powder having a Mohs' scale of hardness of not less than 6 include cromic oxide (e.g. Cr$_2$O$_3$), $\alpha$-alumina and $\alpha$-iron oxide (e.g. Fe$_2$O$_3$). In the invention, there is preferably employed a nonmagnetic inorganic powder having a Mohs' scale of hardness of not less than 8 such as cromic oxide and $\alpha$-alumina. The nonmagnetic inorganic powder preferably has a mean diameter in the range of 0.2-0.8 $\mu$m, more preferably 0.3-0.5 $\mu$m.

Furthermore, the magnetic recording layer preferably contains carbon black.

The magnetic recording medium of the present invention can be produced by the following procedure.

In the first place, the above-described ferromagnetic metal powder and a binder, and optionally a nonmagnetic inorganic powder, carbon black, lublicants, etc. are kneaded with an appropriate solvent to prepare a magnetic paint (or dispersion). The solvent employable in the invention is a known solvent used for the preparation of the conventional magnetic paint such as methyl ethyl ketone and cyclohexanone. The kneading procedure can be carried out by the conventional method using apparatus employed for the preparation of the magnetic paint.

In the preparation of the magnetic paint employable in the invention, other additives such as a dispersing agent and an antistatic agent can be also employed in combination with the above-described components.

In the second place, the magnetic paint prepared as above is applied onto one or both surfaces of the nonmagnetic support. Generally, a magnetic recording layer is formed by applying the magnetic paint directly on the nonmagnetic support, but it is also possible to provide an adhesive layer or a subbing layer between the magnetic paint layer and the nonmagnetic support. The applying procedure can be performed according to the conventional method.

The magnetic recording layer provided on the surfaces of the nonmagnetic support has a thickness (thickness in dry state) generally in the range of approx. 0.5–10 μm, preferably in the range of 1.5–7.0 μm.

It is preferable that the procedure for the preparation of the magnetic paint be performed carefully so as to obviate breakage of the ferromagnetic powder. Also preferable is that the aggremeration of the ferromagnetic powder in the magnetic paint is well obviated, for example, by stirring sufficiently stirring the magnetic paint until the coating procedure is started.

If necessary, a smoothing process is further carried out. The magnetic recording medium being been subjected to the process such as the smoothing process is subsequently cut to give a medium in the form of disk or continuous tape.

The examples and the comparison examples of the present invention are given below.

EXAMPLE 1

Preparation of needle-shaped $\gamma\text{-Fe}_2\text{O}_3$

Into a reaction vessel (50 cm×50 cm×25 cm, depth) equipped with a cooling means, a heating means and a ultrasonic stirring means was introduced 32.3 kg of an aqueous solution of 15.0 wt. % sodium hydroxide (purity: 99.9%) in a pure water. The depth of the introduced solution was less than 15 cm. The temperature of the solution was then adjusted to 10° C.±0.3° C. To the sodium hydroxide solution was added 7.0 kg of an aqueous solution of 30.5 wt. % $FeCl_2$ (purity: 99.9%) in a pure water kept at a temperature of 10° C.±0.3° C. The addition was made under stirring by the ultrasonic stirring means by means of one hundred nozzles attached to the vessel with 5 cm space from each other.

The reaction mixture (i.e., suspension) was then stirred at a temperature of 10° C.±0.3° C. for 12 hours.

Subsequently, to the reaction mixture was introduced air kept at a temperature of 10° C.±0.3° C., through the one hundred nozzles at a rate of 20 l/min, and then 3 l/min. for 12 hours. Thus needle-shaped α-FeOOH was obtained. The reaction mixture was kept at 10° C.±0.3° C. during the reaction.

The needle-shaped α-FeOOH was collected over a filter and washed with a pure water until the ion concentration in the washings reached a level of less than 50 ppm. The collected α-FeOOH was then dried in an oven at 100° C.

The dried needle-shaped α-FeOOH (1,500 g) was oxidized in a 150 l-fluidized-bed furnace by introducing air (kept at 500° C.±2° C.) at a rate of 400 l/min. for 2 hrs. Thus, a needle-shaped $\alpha\text{-Fe}_2\text{O}_3$ was obtained.

The atmosphere in the furnace was then replaced with a nitrogen gas, and a hydrogen gas (kept at 350° C.±5° C.) was subsequently introduced into the furnace for 2 hours at a rate of 400 l/min. for reducing the needle-shaped $\alpha\text{-Fe}_2\text{O}_3$. Thus, needle-shaped $Fe_3O_4$ was obtained.

The atmosphere in the furnace was replaced again with a nitrogen gas, and subsequently a mixture of nitrogen and air (99:1) kept at 250° C.±2° C. was introduced into the furnace for 5 hours at a rate of 400 l/min. Thus, a needle-shaped $\gamma\text{-Fe}_2\text{O}_3$ was obtained.

The resulting needle-shaped $\alpha\text{-Fe}_2\text{O}_3$ was pressed statically at 1,000 kg/cm² to increase the tapping density.

The obtained needle-shaped $\gamma\text{-Fe}_2\text{O}_3$ powder had a BET specific surface area of 30 m²/g, a saturation magnetization (σs) of 74 emu/g, a coercive force of 380 Oe, a tapping density of 1.05 g/cm³ and an aspect ratio of 12/1.

(1)

Composition of Magnetic Paint
Needle-shaped $\alpha\text{-Fe}_2\text{O}_3$: 1,000 g.
Vinyl chloride/vinyl acetate/vinyl alcohol copolymer (92: 2: 6, polymerization degree: approx. 400): 150 g.
Polyester-polyurethane resin (number average molecular weight: approx. 10,000): 50 g.
Oleic acid: 20 g.
Dimethylpolysiloxane (polymerization degree: approx. 60): 10 g.
Carbon black (mean diameter: 20 mμ): 10 g.
α-Almina (mean diameter: 0.5 μm): 10 g.
Methyl ethyl ketone: 1,200 g.
Cyclohexanone: 1,200 g.

(2)

Preparation of Magnetic Paint
The above-mentioned composition was introduced together with 4 kg. of glass beads (diameter: 0.5 mm) into a 5 l-batch type sand grinder, and the mixing was conducted at a linear speed of 500 m/s for 5 hours. The mixture was then filtered over a filter (mean pore sized: 0.5 μm) to give a magnetic paint.

(3)

Coating of Magnetic Paint
The magnetic paint was coated on a polyethylene terephtalate film (thickness: 7 μm) to give a coated film of 5 μm (as dry film). The coated film was subjected to orienting procedure using an explosion proof air-core solenoid at 2,000 gauss, while the film was still wet, and then was dried.

(4)

Smoothing Treatment, etc.
The magnetic paint layer was calendered at a linear speed of 500 kg/cm at 100° C. and the resulting composited film was slit to give a tape of 3.81 mm width. The obtained tape was encased in a case to prepare an audio cassette tape.

EXAMPLE 2

The procedures of Example 1 were repeated except that the coating method was changed to the following method, to give an audio cassette tape.

Coating of Magnetic Paint

The magnetic paint was coated on a polyethylene terephtalate film (thickness: 7 μm) to give a coated film of 5 μm (as dry film). The coated film was once subjected to orienting procedure using an air-core solenoid at 2,000 gauss, while the film was still wet, and then was dried.

EXAMPLE 3

The procedures of Example 1 were repeated except that the process of the preparation of the magnetic paint was changed to the following method, to give an audio cassette tape.

Preparation of Magnetic Paint

The same composition as in Example 1 was introduced together with 10 kg. of glass beads (diameter: 10 mm) into a 10 l-ball mill, and the mixing was conducted at 20 rpm for 48 hours. The mixture was then filtered over a filter(mean pore sized: 0.5 μm) to give a magnetic paint.

EXAMPLE 4

The procedures of Example 1 were repeated except that the coating method employed in Example 2 was adopted and the process of the preparation of the magnetic paint employed in Example 3 was adopted, to give an audio cassette tape.

Comparison Example 1

The procedures of Example 1 were repeated except that the ferromagnetic powder was replaced with that obtained in the following process, to give an audio cassette tape.

Preparation of needle-shaped α-Fe₂O₃

Into a 50 l-reaction vessel equipped with an agitating blade (diameter: 10 cm) was introduced 32.3 kg of an aqueous solution of 15.0 wt. % sodium hydroxide (purity: 99%) in an industrial water. The depth of the introduced solution was 50 cm. The temperature of the solution was then adjusted to room temperature (20°–35° C.).

To the sodium hydroxide solution was added 7.0 kg of an aqueous solution of 30.5 wt. FeCl₂ (purity: 99%) in an industrial water kept at a temperature of 20°–30° C. The addition was made at 20°–30° C. under stirring by the agitating blade at 300 rpm and by means of one nozzle attached to the vessel.

The reaction mixture (i.e., suspension) was then stirred at a temperature of 10° C.±0.3° C. for 12 hours.

Subsequently, to the reaction mixture was introduced air kept at a temperature of 20°–30° C., through the one nozzle at a rate of 20 l/min. and then 3 l/min. for 12 hours. Thus needle-shaped α-FeOOH was obtained. The reaction mixture was kept at 20°–30° C. during the reaction.

The needle-shaped α-FeOOH was collected over a filter and washed with an industrial water until the ion concentration in the washings reached a level of less than 200 ppm. The collected α-FeOOH was then dried in an oven at 100° C.

The dried needle-shaped α-FeOOH (1,500 g) was oxidized in a 30 l-rotary oven by introducing air (kept at 500° C.±5° C.) at a rate of 12 l/min. for 2 hrs. Thus, a needle-shaped α-Fe₂O₃ was obtained.

The atmosphere in the furnace was then replaced with a nitrogen gas, and a hydrogen gas (kept at 350° C.±10° C.) was subsequently introduced into the furnace for 2 hours at a rate of 12 l/min. for reducing the needle-shaped α-Fe₂O₃. Thus, needle-shaped Fe₃O₄ was obtained.

The atmosphere in the furnace was replaced again with a nitrogen gas, and subsequently air kept at 250° C.±5° C. was introduced into the furnace for 2 hours at a rate of 5 l/min. Thus, a needle-shaped γ-Fe₂O₃ was obtained.

The obtained needle-shaped γ-Fe₂O₃ powder had a BET specific surface area of 27 m²/g, a saturation magnetization ($\sigma s$) of 71 emu/g, a coercive force of 370 Oe, a tapping density of 0.72 g/cm³ and an aspect ratio of 11/1.

Comparison Example 2

The procedures of Comparison Example 1 were repeated except that the coating method was changed to that used in Example 2, to give an audio cassette tape.

The audio cassette tapes obtained in Examples 1–4 and Comparison Examples 1–2 were measured with respect to the residual magnetic flux density (Br), γ value, H₁ value, H₂ value, MOL 315, SOL 10K, and BN. The measured values together with the corecive force (Hc) of the resulting magnetic recording layer are set forth in Table 1. The relationships between the γ value and Br of these audio tapes are illustrated in FIG. 2-a, by Ex 1–Ex 4 and c-1 and c-2.

The measurement was done by the following methods.

(1) Residual Flux Density (Br)

The residual flux density is determined in the direction along the oriented ferromagnetic powder at an external magnetic field of 1,000 Oe, by means of VSM-III (available from Toel Industry Co., Ltd. Japan).

In the following examples, the residual flux density is determined at an external magnetic field of 2,000 Oe the ferromagnetic Co-containing powder, and an external magnetic field of 5,000 Oe for ferromagnetic metal powder.

(2) Coercive Force (Ho)

The coercive force is a value of the external magnetic field where the magnetic flux density is 0 gauss in the hysteresis curve.

(3) H₁ value

This value (Oe) is a value of external magnetic field determined when a magnetic flux density of the magnetic hysteresis curve in the fourth quadrant is equivalent to one-third of the maximum magnetic flux densiy of said magnetic hysteresis curve in the third quadrant;

(4)

H₂ value

This value (Oe) is a value of external magnetic field determined when a magnetic flux density of the magnetic hysteresis curve in the first quadrant is equivalent to one-third of the maximum magnetic flux densiy of the magnetic hysteresis curve in the first quadrant;

(5)

γ value

This value is calculated by the forementioned formula (II) using the Hc value and the value of H₁-H₂.

(6)

MOL 315

This value is determined from the maximum output power (distortion ratio: 3%) at 315 Hz in comparison with that of the reference tape. The value is expressed in terms of a relative value based on the value (shifted to 0 dB) given by the reference tape prepared in each of the comparison examples. The measurement of the output power is done by means of a ZX-9 type cassette deck (available from Nakamichi Co., Ltd., Japan).

(7)

SOL 10K

This value is determined from the saturated output power at 10 KHz in comparison with that of the reference tape. The value is expressed in terms of a relative value based on the value (shifted to 0 dB) given by the reference tape prepared in each of the comparison examples. The measurement of the output power is done by means of a ZX-9 type cassette deck (available from Nakamichi Co., Ltd., Japan).

(8) BN

The value is determined by correcting the bias noise level of a cassette tape (determined based on that of the reference tape) using JISA curve. The value is expressed in terms of a relative value based on the value (shifted to 0 dB) given by the reference tape prepared in each of the comparison examples. The measurement of the output power is done by means of a ZX-9 type cassette deck (available from Nakamichi Co., Ltd., Japan).

The results set forth in Table 1 are expressed by the value using the audio tape obtained in Comparison Examle 1 as the reference tape.

TABLE 1

|  | Example | | | | Com. Ex. | |
| --- | --- | --- | --- | --- | --- | --- |
|  | 1 | 2 | 3 | 4 | 1 | 2 |
| Br (gauss) | 1750 | 1720 | 1700 | 1690 | 1650 | 1620 |
| γ Value | 1.50 | 1.56 | 1.62 | 1.66 | 1.67 | 1.83 |
| Hc (Oe) | 380 | 380 | 380 | 380 | 370 | 370 |
| $H_1$ (Oe) | 353 | 351 | 349 | 347 | 341 | 339 |
| $H_2$ (Oe) | 410 | 411 | 418 | 418 | 402 | 406 |
| MOL 315 (dB) | +2.1 | +1.8 | +1.5 | +1.1 | 0 | −0.4 |
| SOL 10K | +1.8 | +1.3 | +1.1 | +0.9 | 0 | −0.2 |
| BN (dB) | −1.0 | −0.8 | −0.6 | −0.5 | 0 | +0.2 |

The results in Table 1 clearly indicate that the audio tapes of the invention employing the ferromagnetic γ-iron oxide having the γ-value located in the A-1 area specified in the invention are high in MOL 315, SOL 10K and low in BN. This means that the audio tapes of the invention are advantageously used.

EXAMPLE 5

The procedures of Example 1 were repeated except that the ferromagnetic powder was replaced with that obtained in the following process, to give an audio cassette tape.

Preparation of needle-shaped Co-γ-$Fe_2O_3$

Into the same reaction vessel as in Example 1 was introduced 12.5 l of an aqueous solution containing 0.38 mol of cobalt sulfate (purity: 99.9%) in a pure water. To the solution was added 1 kg of the needle-shaped α-$Fe_2O_3$ prepared in Example 1. To the resulting mixture was introduced a nitrogen gas to purge the air. The mixture was stirred by means of the ultrasonic stirring means to finely disperse the needle-shaped α-$Fe_2O_3$.

To the resulting dispersion kept at a temperature of 93° C.±0.5° C. was then added 2.58 l of 6.98 N-aqueous solution of sodium hydroxide (purity: 99.9%) in a pure water kept at a temperature of 93° C.±0.5° C. The addition was made under stirring by the ultrasonic stirring means by means of the one hundred nozzles.

The reaction mixture (i.e., suspension) was then stirred at a temperature of 93° C.±0.5° C. for 3 hours.

The solid was collected over a filter and washed with a pure water until the ion concentration in the washings reached a level of less than 50 ppm. The collected needle-shaped Co-α-$Fe_2O_3$ was then dried in an oven at 100° C.

The resulting needle-shaped Co-α-$Fe_2O_3$ was pressed statically at 1,000 kg/$cm^2$ to increase the tapping density.

The obtained needle-shaped Co-γ-$Fe_2O_3$ powder had a BET specific surface area of 28 $m^2$/g, a saturation magnetization ($\sigma s$) of 80 emu/g, a coercive force of 650 Oe, a tapping density of 1.03 g/$cm^3$ and an aspect ratio of 12/1.

EXAMPLE 6

The procedures of Example 2 were repeated except for using the needle-shaped Co-γ-$Fe_2O_3$ powder of Example 5 as ferromagnetic powder, to obtain an audio cassette tape.

EXAMPLE 7

The procedures of Example 3 were repeated except for using the needle-shaped Co-γ-$Fe_2O_3$ powder of Example 5 as ferromagnetic powder, to obtain an audio cassette tape.

EXAMPLE 8

The procedures of Example 4 were repeated except for using the needle-shaped Co-γ-$Fe_2O_3$ powder of Example 5 as ferromagnetic powder, to obtain an audio cassette tape.

Comparison Example 3

The procedures of Example 1 were repeated except that the ferromagnetic powder was replaced with that obtained in the following process, to give an audio cassette tape.

Preparation of needle-shaped Co-γ-$Fe_2O_3$

Into the same reaction vessel as in Comparison Example 1 was introduced 12.5 l of an aqueous solution containing 0.38 mol of cobalt sulfate (purity: 99%) in an industrial water. To the solution was added 1 kg of the needle-shaped α-$Fe_2O_3$ prepared in Comparison Example 2. To the resulting mixture was introduced a nitrogen gas to purge the air.

To the resulting dispersion kept at a temperature of 93° C.±02° C. was then added 2.58 l of 6.98 N-aqueous solution of sodium hydroxide (purity: 99%) in an industrial water kept at a temperature of 93° C.±2° C. The addition was made under stirring by means of the one nozzle.

The reaction mixture (i.e., suspension) was then stirred for 3 hours.

The solid was collected over a filter and washed with a pure water until the ion concentration in the washings reached a level of less than 200 ppm. The collected needle-shaped Co-α-$Fe_2O_3$ was then dried in an oven at 100° C.

The obtained needle-shaped Co-γ-$Fe_2O_3$ powder had a BET specific surface area of 27 $m^2$/g, a saturation magnetion ($\sigma s$) of 76 emu/g, a coercive force of 630 Oe, a tapping density of 0.68 g/$cm^3$ and an aspect ratio of 11/1.

Comparison Example 4

The procedures of Comparison Example 3 were repeated except that the coating method was changed to that used in Example 2, to give an audio cassette tape.

The audio cassette tapes obtained in Examples 5–8 and Comparison Examples 3–4 were measured with respect to the residual magnetic flux density (Br), γ value, $H_1$ value, $H_2$ value, MOL 315, SOL 10K, and BN. The measured values together with the coercive force (Hc) of the resulting magnetic recording layer are set forth in Table 2. The relationships between the γ value and Br of these audio tapes are illustrated in FIG. 2-b, by Ex 5-Ex 8 and c-3 and c-4.

The measurement was done by the aforementioned methods.

The results set forth in Table 2 are expressed by the value using the audio tape obtained in Comparison Example 3 as the reference tape.

TABLE 2

|  | Example | | | | Com. Ex. | |
| --- | --- | --- | --- | --- | --- | --- |
|  | 5 | 6 | 7 | 8 | 3 | 4 |
| Br (gauss) | 1910 | 1880 | 1860 | 1830 | 1830 | 1780 |
| γ Value | 1.52 | 1.63 | 1.68 | 1.71 | 1.85 | 1.92 |
| Hc (Oe) | 650 | 650 | 650 | 650 | 630 | 630 |
| $H_1$ (Oe) | 604 | 602 | 599 | 597 | 577 | 577 |
| $H_2$ (Oe) | 702 | 707 | 708 | 708 | 693 | 691 |
| MOL 315 (dB) | +2.3 | +1.7 | +1.4 | +1.3 | 0 | −0.7 |
| SOL 10K | +1.6 | +1.1 | +0.9 | +0.7 | 0 | −0.6 |
| BN (dB) | −1.2 | −1.0 | −0.9 | −0.7 | 0 | +0.3 |

The results in Table 2 clearly indicate that the audio tapes of the invention employing the ferromagnetic Co-containing γ-iron oxide having the γ-value located in the A-1 area specified in the invention are high in MOL 315, SOL 10K and low in BN. This means that the audio tapes of the invention are advantageously used.

EXAMPLE 9

The procedures of Example 1 were repeated except that the ferromagnetic powder was replaced with the ferromagnetic metal powder obtained in the following process, to give an audio cassette tape.

Preparation of needle-shaped ferromagnetic metal powder

The needle-shaped γ-FeOOH (1,500 g.) prepared as an intermediate in the process of the preparation of the needle-shaped γ-$Fe_2O_3$ in Example 1 was introduced into a 150 l-fluidized bed furnace. To the furnace was introduced a hydrogen gas at 500° C.±5° C. at a flow rate of 500 l/min. for 10 hours for reducing the γ-FeOOH. Thus, the desired needle-shaped ferromagnetic metal powder was obtained.

The resulting needle-shaped ferromagnetic metal powder was pressed statically at 1,000 kg/$cm^2$ to increase the tapping density.

The obtained needle-shaped ferromagnetic metal powder had a BET specific surface area of 42 $m^2$/g., a saturation magnetization (σs) of 147 emu/g, a coercive force of 1,250 Oe, a tapping density of 0.92 g/$cm^3$ and an aspect ratio of 12/1.

EXAMPLE 10

The procedures of Example 2 were repeated except for using the needle-shaped ferromagnetic metal powder of Example 9 as ferromagnetic powder, to obtain an audio cassette tape.

EXAMPLE 11

The procedures of Example 3 were repeated except for using the needle-shaped ferromagnetic metal powder of Example 9 as ferromagnetic powder, to obtain an audio cassette tape.

EXAMPLE 12

The procedures of Example 4 were repeated except for using the needle-shaped ferromagnetic metal powder of Example 9 as ferromagnetic powder, to obtain an audio cassette tape.

Comparison Example 5

The procedures of Example 1 were repeated except that the ferromagnetic powder was replaced with the ferromagnetic metal powder obtained in the following process, to give an audio cassette tape.

Preparation of needle-shaped ferromagnetic metal powder

The needle-shaped γ-FeOOH (1,500 g.) prepared as an intermediate in the process of the preparation of the needle-shaped γ-$Fe_2O_3$ in Comparison Example 1 was introduced into a 20 l-rotary electronic oven. To the oven was introduced a hydrogen gas at 500° C.±10° C. at a flow rate of 24 l/min. for 10 hours, with rotation at 20 rpm, for reducing the γ-FeOOH. Thus, a needle-shaped ferromagnetic metal powder was obtained.

The obtained needle-shaped ferromagnetic metal powder had a BET specific surface area of 41 $m^2$/g, a saturation magnetization (σs) of 132 emu/g, a coercive force of 1,260 Oe, a tapping density of 0.52 g/$cm^3$ and an aspect ratio of 11/1.

Comparison Example 6

The procedures of Comparison Example 5 were repeated except that the coating method was changed to that used in Example 2, to give an audio cassette tape.

The audio cassette tapes obtained in Examples 9-12 and Comparison Examples 5-6 were measured with respect to the residual magnetic flux density (Br), γ value, $H_1$ value, $H_2$ value, MOL 315, SOL 10K, and BN. The measured values together with the coercive force (Hc) of the resulting magnetic recording layer are set forth in Table 3. The relationships between the γ value and Br of these audio tapes are illustrated in FIG. 2-c, by Ex 9-Ex 12 and c-5 and c-6.

The measurement was done by the aforementioned methods.

The results set forth in Table 3 are expressed by the value using the audio tape obtained in Comparison Examle 5 as the reference tape.

TABLE 3

|  | Example | | | | Com. Ex. | |
| --- | --- | --- | --- | --- | --- | --- |
|  | 9 | 10 | 11 | 12 | 5 | 6 |
| Br (gauss) | 3600 | 3570 | 3530 | 3590 | 3450 | 3400 |
| γ Value | 2.13 | 2.25 | 2.30 | 2.36 | 2.50 | 2.55 |
| Hc (Oe) | 1250 | 1250 | 1250 | 1250 | 1260 | 1260 |
| $H_1$ (Oe) | 1127 | 1121 | 1117 | 1114 | 1130 | 1128 |
| $H_2$ (Oe) | 1393 | 1402 | 1404 | 1409 | 1454 | 1454 |
| MOL 315 (dB) | +2.6 | +2.1 | +1.6 | +1.1 | 0 | −0.6 |
| SOL 10K | +2.1 | +1.6 | +1.3 | +0.6 | 0 | −0.5 |
| BN (dB) | −1.3 | −1.0 | −0.7 | −0.6 | 0 | +0.4 |

The results in Table 3 clearly indicate that the audio tapes of the invention employing the ferromagnetic metal powder having the γ-value located in the A-1 area specified in the invention are high in MOL 315, SOL 10K and low in BN. This means that the audio tapes of the invention are advantageously used.

EXAMPLE 13

(1)

Composition of Magnetic Paint
Needle-shaped Co-γ-$Fe_2O_3$ (prepared in Example 5): 1,000 g.

Vinyl chloride/vinyl acetate/vinyl alcohol copolymer (92: 2: 6, polymerization degree: approx. 400): 150 g.
Polyester-polyurethane resin (number average molecular weight: approx. 10,000): 75 g.
Butyl stearate: 10 g.
Oleic acid: 20 g.
Dimethylpolysiloxane (polymerization degree: approx. 60): 10 g.
Carbon black (mean diameter: 20 mμ): 10 g.
α-Almina (mean diameter: 0.5 μm): 10 g.
Methyl ethyl ketone: 1,200 g.
Cyclohexanone: 1,200 g.

(2)

Preparation of Magnetic Paint

The above-mentioned composition was introduced together with 4 kg. of glass beads (diameter: 0.5 mm) into a 5 l-batch type sand grinder, and the mixing was conducted at a linear speed of 500 m/s for 5 hours. 100 g. of polyisocyanate (Desmodure L-75, tradename) was added to the mixture. The resulting mixture was further mixed for another 20 min. and then filtered over a filter (mean pore sized: 0.3 μm) to give a magnetic paint.

(3)

Coating of Magnetic Paint

The magnetic paint was coated on a polyethylene terephtalate film (thickness: 14 μm) to give a coated film of 5 μm (as dry film). The coated film was subjected to orienting procedure using an explosion proof air-core solenoid at 2,000 gauss, while the film was still wet, and then was dried.

(4)

Smoothing Treatment, etc.

The magnetic paint layer was calendered at a linear speed of 500 kg/cm at 100° C. and the resulting composited film was slit to give a tape of ½ inch width. The obtained tape was encased in a case to prepare a VHS-tape video cassette tape.

EXAMPLE 14

The procedures of Example 13 were repeated except that the coating method was changed to that used in Example 2, to give a video cassette tape.

Comparison Example 7

The procedures of Example 13 were repeated except that the Co-γ-Fe₂O₃ obtained in Comparison Example 3 was changed to that used in Example 2, to give a video cassette tape.

Comparison Example 8

The procedures of Comparison Example 7 were repeated except that the coating method was changed to that used in Example 2, to give a video cassette tape.

The video cassette tapes obtained in Examples 13 and 14 and Comparison Examples 7 and 8 were measured with respect to a video output power (VS), Y·S/N ratio, and C·S/N ratio, in addition to the subjects given hereinbefore. The measurement was done by the following methods.

(1)

Video Output Power (Vs)

The video output power is determined at 4 MHz in comparison with that of the reference tape. The value is expressed in terms of a relative value based on the value (shifted to 0 dB) given by the reference tape prepared in each of the comparison examples. The measurement of the output power is done by means of an NV-870 HD-type Output Level Measurement Device (Matsushita Electric Industrial Co., Ltd., Japan) using a senduct head as the magnetic head.

(2)

Y·S/N Ratio

This value is determined by measuring an S/N ratio of a luminance signal at 4 MHz in comparison with that of the reference tape. The value is expressed in terms of a relative value based on the value (shifted to 0 dB) given by the reference tape prepared in each of the comparison examples. The measurement was done using the same device as described in the (1) above.

(3) C·S/N Ratio

This value is determined by measuring an S/N ratio of a color signal at 4 MHz in comparsion with that of the reference tape. The value is expressed in terms of a relative value based on the value (shifted to 0 dB) given by the reference tape prepared in each of the comparison examples. The measurement was done using the same device as described in the (1) above.

The results set forth in Table 4 are expressed by the value using the video tape obtained in Comparison Example 7 as the reference tape.

TABLE 4

|  | Example | | Com. Ex. | |
| --- | --- | --- | --- | --- |
|  | 13 | 14 | 7 | 8 |
| Br (gauss) | 1850 | 1820 | 1770 | 1740 |
| γ Value | 1.53 | 1.61 | 1.87 | 1.95 |
| Hc (Oe) | 650 | 650 | 630 | 630 |
| H₁ (Oe) | 604 | 601 | 576 | 575 |
| H₂ (Oe) | 703 | 705 | 693 | 697 |
| VS (dB) | +2.1 | +1.8 | 0 | −0.7 |
| Y · S/N (dB) | +2.6 | +2.1 | 0 | −1.3 |
| C · S/N (dB) | +1.9 | +1.5 | 0 | −0.9 |

The results in Table 4 clearly indicate that the video cassette tapes of the invention employing the ferromagnetic Co-containing γ-iron oxide having the γ-value specified in the invention are high in the video output power, S/N ratio for color signal, and S/N value for luminance signal. This means that the video tapes of the invention have improved electromagnetic conversion characteristics.

EXAMPLE 15

The procedures of Example 13 were repeated except that the ferromagnetic metal powder obtained in Example 9 was employed, to give a video cassette tape.

EXAMPLE 16

The procedures of Example 15 were repeated except that the coating method was changed to that used in Example 2, to give a video cassette tape.

COMPARISON EXAMPLE 9

The procedures of Example 15 were repeated except that the ferromagnetic metal powder obtained in Comparison Example 5 was employed, to give a video cassette tape.

COMPARISON EXAMPLE 10

The procedures of Comparison Example 9 were repeated except that the coating method was changed to that used in Example 2, to give a video cassette tape.

The video cassette tapes obtained in Examples 15 and 16 and Comparison Examples 9 and 10 were measured with respect to a video output power (VS), Y·S/N ratio, and C·S/N ratio, in addition to the subjects given hereinbefore. The measurement was done by the following methods.

The results set forth in Table 5 are expressed by the value using the video tape obtained in Comparison Examle 9 as the reference tape.

TABLE 5

|  | Example | | Com. Ex | |
|---|---|---|---|---|
|  | 15 | 16 | 9 | 10 |
| Br (gauss) | 3360 | 3300 | 3240 | 3190 |
| γ Value | 2.15 | 2.22 | 2.44 | 2.54 |
| Hc (Oe) | 1250 | 1250 | 1260 | 1260 |
| H$_1$ (Oe) | 1126 | 1120 | 1140 | 1124 |
| H$_2$ (Oe) | 1394 | 1397 | 1452 | 1449 |
| VS (dB) | +2.4 | +1.9 | 0 | −1.3 |
| Y · S/N (dB) | +2.7 | +2.2 | 0 | −1.6 |
| C · S/N (dB) | +2.2 | +2.0 | 0 | −1.1 |

The results in Table 5 clearly indicate that the video cassette tapes of the invention employing the ferromagnetic metal having the γ-value specified in the invention are high in the video output power, S/N ratio for color signal, and S/N value for luminance signal. This means that the video tapes of the invention have improved electromagnetic conversion characteristics.

We claim:

1. A magnetic recording medium comprising a nonmagnetic support and a magnetic recording layer provided on said support, said magnetic recording layer comprising a ferromagnetic powder dispersed in a binder, in which H$_1$ in terms of oersted which is a value of external magnetic field determined when a magnetic flux density of a magnetic hysteresis curve determined in the direction of orientation of the ferromagnetic powder in the magnetic recording layer in the fourth quadrant is equivalent to one-third of the maximum magnetic flux densiy of said magnetic hysteresis curve in the third quadrant;

H$_2$ in terms of oersted which is value of external magnetic field determined when a magnetic flux density of said magnetic hysteresis curve in the first quadrant is equivalent to one-hird of the maximum magnetic flux densiy of said magnetic hysteresis curve in the first quadrant;

Hc in terms of oersted which is a coercive force of the magnetic recording layer; and Br in terms of gauss which is a residual magnetic flux density of the magnetic recording layer, have the relationship defined by the following inequality:

$$10\times(H_2-H_1)/Hc \leq 0.0004\times Br+1.$$

2. The magnetic recording medium as claimed in claim 1, wherein the ferromagnetic powder is a ferromagnetic iron oxide powder.

3. The magnetic recording medium as claimed in claim 2, in which the value equivalent to $10\times(_2-H_1)/Hc$ ranges from 0.80 to 1.70.

4. The magnetic recording medium as claimed in claim 1, wherein the ferromagnetic powder is a ferromagnetic oxide powder selected from the group consisting of Co-containing $Fe_2O_3$, Co-containing $Fe_3O_4$, Ba-containing ferrite, Sr-containing ferrite and $CrO_2$.

5. The magnetic recording medium as claimed in claim 4, in which the value equivalent to $10\times(H_2-H_1)/Hc$ ranges from 0.85 to 1.75.

6. The magnetic recording medium as claimed in claim 1, wherein the ferromagnetic powder is a ferromagnetic metal powder.

7. The magnetic recording medium as claimed in claim 6, in which the value equivalent to $10\times(H_2-H_1)/Hc$ ranges from 1.20 to 2.45.

* * * * *